(12) United States Patent
Cruson et al.

(10) Patent No.: US 9,032,885 B2
(45) Date of Patent: May 19, 2015

(54) SOIL DEFLECTOR WING FOR FURROW OPENER WITH REPLACEABLE WINGED TIP BODY

(76) Inventors: Brian Cruson, Rosedale (CA); Clark Evan Jack Behrns, Balgonie (CA)

(*) Notice: Subject to any disclaimer, the term of this patent is extended or adjusted under 35 U.S.C. 154(b) by 526 days.

(21) Appl. No.: 13/415,050

(22) Filed: Mar. 8, 2012

(65) Prior Publication Data
US 2013/0233215 A1 Sep. 12, 2013

(51) Int. Cl.
*A01C 5/06* (2006.01)
*A01C 23/02* (2006.01)

(52) U.S. Cl.
CPC .............. *A01C 5/062* (2013.01); *A01C 23/023* (2013.01)

(58) Field of Classification Search
USPC ......... 111/119, 141, 124, 125, 149, 152, 153; 172/684.5, 719, 721–726, 730, 732, 172/770
See application file for complete search history.

(56) References Cited

U.S. PATENT DOCUMENTS

| | | | | |
|---|---|---|---|---|
| 6,178,900 | B1* | 1/2001 | Dietrich, Sr. | 111/119 |
| 6,405,665 | B1* | 6/2002 | Henry et al. | 111/152 |
| 7,588,091 | B1* | 9/2009 | Neudorf et al. | 172/773 |
| 7,617,783 | B1* | 11/2009 | Cruson | 111/150 |
| 8,453,586 | B2* | 6/2013 | Cruson | 111/124 |

FOREIGN PATENT DOCUMENTS

CA 2432272 2/2008

* cited by examiner

*Primary Examiner* — Alicia Torres
(74) *Attorney, Agent, or Firm* — Ryan W. Dupuis; Kyle R. Satterthwaiter; Ade & Company, Inc.

(57) ABSTRACT

A paired row opener has a furrowing tip arranged to be selectively supported on a body of the opener. The furrowing tip includes a knife portion and a pair of wing portions extending rearwardly and outwardly therefrom where are separable together from the opener body. A pair of deflector wings are integrally formed on the opener body above inner edges of the respective wing portions which are abutted with the opener body so as to deflect disturbed soil away from a seam between the inner edge of the wing portions and the opener body. An insulated mounting block is fastened onto a rear bracket of the opener body which receives an anhydrous ammonia delivery tube therethrough so permit optional delivery of anhydrous ammonia at a location which is insulated and spaced rearwardly from the opener body.

19 Claims, 9 Drawing Sheets

SOIL DEFLECTOR WING FOR FURROW OPENER WITH REPLACEABLE WINGED TIP BODY

FIELD OF THE INVENTION

The present invention relates to a furrow opener including an opener body mounted on an implement shank and a replaceable tip body mounted on the opener body which includes wing portions, and more particularly the present invention relates to an opener body with a replaceable tip body in which the opener body includes deflector wings above the wing portions of the tip body to deflect soil away from a junction between the wing portions of the tip body and the opener body.

BACKGROUND

A typical arrangement of a furrow row opener includes a knife to produce a deep narrow furrow to position fertilizer in the deepest part of a furrow and wings extending rearwardly and laterally outward in relation to the knife for widening the furrow to position a pair of seeded rows along opposing sides of the furrow above the fertilizer. One example of a furrow opener of this type is disclosed in Canadian Patent 2,432,272 in which the knife and wings are integrally formed on a tip body which is readily separable from the opener body for replacement if the tip becomes worn and requires replacement. When used in some soil conditions, soil can be forced into the seam between the opener body and the tip body which can interfere with product delivery passages communicating between the opener body and tip body or can cause difficulty in replacing the tip body due to the wedging of soil between opener body and tip body.

In some instances it is desirable to use anhydrous ammonia as a fertilizer injected into the furrow. Due to the cooling effect from anhydrous ammonia being readily evaporated as it is injected, known furrow openers for use with anhydrous ammonia typically require a complex insulating structure to insulate the fertilizer passage through the opener body to prevent plugging of the fertilizer or seed passages from frost accumulation.

SUMMARY OF THE INVENTION

According to one aspect of the invention there is provided a furrow opener for use with an agricultural implement supported for movement in a forward working direction and having a plurality of implement shanks, the furrow opener comprising:

an opener body comprising a shank mount arranged to support the opener body on the implement shank for movement therewith in the forward working direction;

a furrowing tip body comprising:
  a tip mount supporting the tip body on the opener body;
  a knife portion projecting forwardly from the tip mount to a forward end of the tip body; and
  at least one wing portion projecting rearwardly from the knife portion and laterally outwardly in relation to a respective side of the opener body in which the wing portion includes an inner edge substantially abutted with the respective side of the opener body;
  the opener body including a deflector wing in association with said at least one wing portion in which the deflector wing projects laterally outwardly from the respective side of the opener body above the inner edge of the wing portion; and
  the tip mount being readily separable from the opener body such that the knife portion and said at least one wing portion are separable from the opener body together with one another.

The use of a deflector wing in proximity to the seam between the top body wings and the opener body which is suitably shaped to deflect soil away from the seam as the furrow opener is advanced through the soil prevents the accumulation of soil between the opener body and tip body. This ensures proper operation of the product delivery passages through the tip body from the opener body regardless of soil conditions.

Preferably the deflector wing associated with said at least one wing portion is formed in proximity to the inner edge of said at least one wing portion so as to be adapted to deflect soil away from the inner edge of said at least one wing portion as the opener is displaced in the forward working direction.

Preferably said at least one wing includes a rear portion which extends rearwardly from the knife portion and the tip mount so as to define the inner edge extending rearward alongside the respective side of the opener body.

Preferably the deflector wing associated with said at least one wing portion is positioned directly above said at least one wing portion.

Preferably the inner edge of said at least one wing portion extends rearwardly at an upward inclination.

Preferably said at least one wing portion extends rearwardly from the knife portion to a rear end which is positioned upwardly and rearwardly in relation to a lowermost portion of the deflector wing associated with the wing portion.

Preferably the deflector wing associated with said at least one wing portion includes a lower surface having a forward portion which extends rearwardly at a laterally outward inclination from a front edge of the deflector wing to define a wedge shape arranged to deflect soil outwardly.

Preferably the lower surface of the deflector wing associated with said at least one wing portion includes a rearward portion which extends rearwardly from the forward portion at an upward inclination alongside the inner edge of the deflector wing.

Preferably the deflector wing associated with said at least one wing portion is integrally and seamless joined with the opener body.

Preferably said at least one wing portion comprises a pair of wing portions extending laterally outwardly from opposing sides of the opener body such that the deflector wings associated with each wing portion is supported on a respective one of the opposing sides of the opener body.

The opener preferably further comprising:
  a primary delivery passage extending through the opener body so as to be arranged to deliver a primary particulate material therethrough; and
  an outlet passage extending through the tip body so as to communicate from the primary delivery passage of the opener body to the wing portions to dispense a primary particulate material therethrough rearwardly of the wing portions.

When provided in combination with an agricultural implement having a plurality of anhydrous ammonia delivery tubes, the furrow opener may further comprise:
  a rear bracket member supported on the opener body rearwardly of the tip body; and
  a mounting block formed of insulating material supported on the rear bracket so as to be selectively separable from the rear bracket member;
  wherein the mounting block includes a delivery passage communicating therethrough so as to be arranged for connection to one of the anhydrous ammonia delivery tubes at a location spaced rearwardly from the opener body.

According to a second aspect of the present invention there is provided a furrow opener for use with an agricultural implement supported for movement in a forward working direction and having a plurality of implement shanks and a plurality of anhydrous ammonia delivery tubes, the furrow opener comprising:

an opener body comprising a shank mount arranged to support the opener body on one of the implement shanks for movement therewith in the forward working direction;

a primary delivery passage extending through the opener body so as to be arranged to deliver a primary particulate material therethrough;

a furrowing tip body comprising:
a tip mount supporting the tip body on the opener body;
an outlet passage extending through the tip body so as to communicate from the primary delivery passage of the opener body to an outlet opening at a rear of the tip body; and
a knife portion projecting forwardly from the tip mount to a forward end of the tip body so as to be arranged to form a furrow in the ground;
the tip mount being readily separable from the opener body such that the knife portion is readily separable from the opener body;

a rear bracket member supported on the opener body rearwardly of the tip body; and a mounting block formed of insulating material supported on the rear bracket so as to be selectively separable from the rear bracket member;

the mounting block including a delivery passage communicating therethrough so as to be arranged for connection to one of the anhydrous ammonia delivery tubes at a location spaced rearwardly from the opener body.

The configuration of the mounting block being formed of insulating material and being arranged for mounting rearwardly of the opener body ensures that the cooling effect resulting from the injection of readily evaporated anhydrous ammonia is isolated from the opener body. Furthermore, the mounting of the mounting block on the rear bracket projecting rearwardly from the opener body also allows for ready interchangeability between anhydrous ammonia delivery and particular material fertilizer delivery.

Preferably the shank mount is arranged to support the opener body on a forward face of the implement shank and the rear bracket extends rearwardly from the opener body below the shank mount such that the mounting block is aligned with an anhydrous ammonia delivery tube rearward of the implement shank.

Preferably the rear bracket comprises a vertical flange including fastener apertures therein in alignment with corresponding fastener apertures in the mounting block which receive fasteners extending therethrough.

Preferably the rear bracket is laterally offset towards one side of the opener body and is mounted against a corresponding side surface of the mounting block.

There may be provided a recess formed in a side surface of the mounting block which receives the rear bracket therein.

Preferably the mounting block includes an upper portion fastened to the rear bracket and a lower portion extending below the rear bracket directly rearward of the tip body in which an outlet of the delivery passage is located in a bottom wall of the lower portion of the mounting block rearward of the tip body.

Preferably the rear bracket is integrally and seamlessly joined with the opener body.

When provided in combination with a secondary delivery tube arranged to deliver a secondary particulate material therethrough, the secondary delivery tube and the mounting block are preferably interchangeably supported on the rear bracket.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated a furrowing tip body generally indicated by reference numeral 10. The tip body 10 is arranged for use with a paired row opener 12 of the type which is suited for mounting on a implement shank 14 of an agricultural cultivator operated in a forward working direction in use.

The opener 12 comprises an opener body 16 including a shank mount 18 arranged for mounting onto the shank 14 using suitable fasteners. The opener also includes a primary delivery passage 20 and a secondary delivery passage 22 arranged for delivering respective materials therethrough, for example particulate seed or various forms of fertilizer and the like.

In the illustrated embodiment the primary delivery passage 20 extends along a front side of the shank mount 18 to be located at the front of the opener body 16 while the secondary delivery passage 22 is arranged to be supported rearwardly of the shank mount for delivering the secondary material therethrough at a location spaced rearwardly of the implement shank. In further embodiments both delivery passages may be mounted ahead of the shank mount or rearwardly of the shank mount. In either instance the opener body 16 extends downwardly and forwardly to a bottom end supporting a lug 24 thereon which projects downwardly and forwardly for supporting the tip body 10 thereon.

The furrowing tip body 10 comprises a cast member forming a tip mount 26 therein in the form of a socket arranged to receive the lug 24 of the opener body therein. The socket defining the tip mount 26 and the lug 24 are arranged for close mating configuration with one another such that transverse mounting apertures 28 extending through the tip mount 26 and the lug 24 are arranged to align with one another in the mated position of the tip body on the opener body to receive a suitable mounting pin 30 which retains the tip body on the opener body. Removal of the pin 30 permits the tip body to be readily separated from the opener body.

The tip body is narrow between two generally parallel opposing side walls 32 extending along opposing sides of the tip mount 26 defined therebetween. The side walls 32 extend forwardly from the tip mount to define a knife portion 34 of similar width as the tip mount 26 which extends downwardly and forwardly to a bottom leading edge 36 of the knife portion which forms a lowermost portion of the tip body. The leading edge 36 includes a pointed carbide tip 38 secured thereon forming the leading edge of the knife portion. The bottom apex of the knife portion is aligned with the socket forming the tip mount 26 so that knife portion is aligned with the opener body and the implement shank upon which it is supported.

Two wing portions 40 are supported to extend generally rearwardly and laterally outwardly from opposing sides of the knife portion. Each wing portion includes a first forward portion 42 having a leading edge 44 which extends laterally outwardly and rearwardly from the side wall 32 of the knife portion from a location positioned upwardly and rearwardly from the leading edge of the knife portion. The leading edge 44 of each wing portion is near horizontal in orientation, locating a suitable carbide insert 46 along the edge thereof. The forward portion 42 of each wing portion also includes an upper surface 48 which extends generally upwardly and rearwardly from the leading edge 44 thereof to be joined with a respective second rearward portion 50 of the wing portion 40 extending rearwardly therefrom.

The second rearward portion 50 of each wing portion includes an outer edge 52 which extends rearward from a rear end of the leading edge 44 of the corresponding first forward portion such that the outer edge extends rearward substantially parallel to the other outer edge 52 and parallel to the forward working direction. The outer edge 52 further extends rearward along the bottom of the tip body in a near horizontal orientation to a rearmost end of the tip body 10.

The second rearward portion 50 of each wing portion also includes an upper surface which is continuous and coplanar with the upper surface of the first forward portion 32 of the wing portion. The upper surface of the rearward portion 50 continues to extend rearward to a rear edge which is adjacent the rearmost end of the tip body.

At an outer side 56 of each rearward portion 50 the upper surface 54 extends to an upright rear edge 58 of the wing portion which is near vertical in orientation at the rearmost end of the tip body so as to be generally in a common plane with a rear face 60 of the tip body.

The tip body also includes a central chamber 62 centrally located between the two wing portions 40 rearward of the tip mount 26. The central chamber 62 includes a top opening 64 which opens through the top end thereof for communication with the open bottom end of the primary delivery passage 20 of the opener body directly thereabove. The central chamber 62 is thus suitably arranged to receive a primary particulate material from the primary delivery passage 20 of the opener body. The central chamber 62 serves to split the material received therein into a pair of rows which are laterally spaced apart when dispensed through two outlet openings 66 located in the rear face 60 at the rearmost end of the tip body.

The central chamber 62 is arranged to be enclosed along the bottom side thereof by a bottom wall 68 which spans substantially a full bottom of the chamber between both the first and second portions of the wing portions 40 from the knife portion at the forward end of the tip body to the rear face 60 at the rearmost end of the tip body.

The central chamber is further enclosed along the rear side thereof by a rear wall 70 between the two outlet openings 66 which serves to define the lateral spacing between the outlet openings 66. The rear wall 70 extends vertically upward from the bottom wall 68 at the rearmost end of the tip body to define the rear face 60 in a common plane with the upright rear edges 58 of the wing portions 40.

A substantial portion of the top of the central chamber 62 is enclosed by the rearward portions 50 of the two wing portions 40 which extend upwardly and inwardly from the respective outer edge 52 to respective inner edges 72 of the wings which are arranged to be abutted against opposing sides of the opener body so that the only opening in the top side of the central chamber 62 is arranged to be occupied by the opener body and the primary delivery passage 20 extending therethrough in communication with the central chamber.

The two outlet openings 66 are arranged such that a plane of each opening is oriented in the vertical rear face at the rearmost end of the tip body generally perpendicular to the forward working direction and in a common plane with one another, with the upright rear edges of the wings and with the rear face 60. The upright rear edges of the wing portions and the upright edge of the rear wall 70 terminate at respective upper free edges arranged to abut the opener body when the tip body is mounted on the opener body such that the outlet openings 66 remain open through the top end of the tip body.

The top of the outlet openings 66 in the assembled position are thus defined by the opener body received between the wing portions and the rear wall 70. The inner edges of the two outlet openings 66 are defined by opposing edges of the rear wall 70 whereas the outer edges of the outlet openings are defined by the upright rear edges of the wings. The bottom wall 68 defines the bottom edge of the outlet openings. In the illustrated embodiment the height of the openings is near but slightly greater than a lateral width of each opening between opposing sides thereof.

The bottom wall 68 includes a substantially flat bottom side 74 which is near horizontal from the knife portion at the front of the tip body to the rear edge at the rearmost end of the tip body, as well as between the two opposing outer edges 52 of the wing portions. The leading edge of the knife portion and the leading edges of the two wing portions are arranged to project downwardly below the bottom side of the bottom wall.

An inner top side of the bottom wall 68 include a central ridge (not shown) formed thereon to extend in the longitudinal direction while being centered in the lateral direction between the outer edges 52 to define two opposing sloping surfaces which extend downwardly and outwardly from opposing sides of the central ridge towards the two outlet openings 66 respectively. The central ridge thus serves to split the seed received in the central chamber from the primary delivery passage 20 so that seed is deflected or diverted into two laterally spaced apart rows exiting from the two outlet openings 66 respectively.

The tip mount 26, the knife portion 34, the wing portions 40, the bottom wall 68 and the rear wall 70 are all cast together as an integral tip body which is selectively mounted on the lug 24 of the opener body and secured by a single mounting pin 30 such that removal of the mounting pin permits all of the components of the tip body to be readily separated from the opener body together for replacement as may be desired.

Once the tip body is attached on the opener body on an implement shank, fertilizer can be fed through the secondary delivery passage 22 to be deposited centrally behind the tip body for alignment with the deepest part of the furrower formed by the knife portion which projects downwardly below the wing portions. Seed deposited in the primary delivery passage 20 is communicated into the central chamber of the tip body where the seed is split on the central ridge to be deflected into a pair of rows deposited through the outlet openings 60 in the rear face of the tip body. The configuration of the bottom wall and the wing portions ensures that the central chamber is substantially fully enclosed about respective top, bottom and outer sides thereof so that the only openings in communication with the central chamber are the outlet openings in the rear face which are well protected from dirt being displaced by the formation of the furrow. In this manner, even in wet conditions, mud and debris is unlikely to enter the outlet openings so that plugging of the primary delivery passage 20, the central chamber 62 and the outlet openings 66 is thereby substantially prevented.

After extended use, the only components which typically suffer from any substantial wearing are the knife portion and the wing portions which can be readily replaced by removing a single fastener through the cooperating apertures of the tip mount and corresponding lug of the opener body respectively. A replacement tip body can then be mounted onto the lug of the opener body and a mounting pin inserted through the cooperating apertures once again for securement on the opener body.

Turning now more particularly to the opener body 16, the body further comprises an upper portion 100 bolted on to the front side of the shank 14 and defining the primary delivery passage 20 extending therethrough forwardly of the shank. The upper portion 100 has a lateral width which is near a width of the shank upon which it is supported.

The opener body also includes a lower portion 102 extending downwardly and forwardly from the upper portion and which is reduced in lateral width relative to the upper portion thereabove so as to be reduced to an overall width between two opposing side surfaces 104 which is near the width of the rear portion of the knife 34 of the tip body. The two side surfaces 104 are substantially parallel to one another and to the forward working direction to extend rearwardly from a front side where they are joined above the knife portion to a rear side adjacent the bottom end of the shank and directly above the rear end of the wings of the tip body.

The opener body also includes a rear bracket 106 which is integrally cast and seamlessly formed thereon to extend rearwardly outward from the rear side of the body below the bottom end of the implement shank. The rear bracket 106 generally comprises a flat plate defining a flange oriented in a vertical plane parallel to the forward working direction. The vertical flange is laterally offset adjacent one of the two side surfaces 104 but remaining recessed laterally inward therefrom by the thickness of bolt heads 108. The bolts 108 are received through vertically spaced apart fastener apertures 110 in the bracket.

A mounting block 112 is fastened to the rear bracket using the bolts for supporting the second delivery passage 22 rearwardly of the shank. The second delivery passage in this instance comprises an anhydrous ammonia delivery tube 114 arranged to conduct liquid anhydrous ammonia therethrough. The mounting block comprises a heat insulating plastic material with a through passage therein for communication with the delivery tube 114 therethrough.

More particularly the block 112 comprises a rectangular block having two sides 116 which are parallel to one another and the forward working direction. The two sides are spaced apart by a width which is slightly less than the overall width of the opener body between the two sides thereof to protect the block from wear as the opener is driven through the soil.

The block 112 includes an upper portion 118 including a recess 120 formed in the corresponding side surface 116 against which the flange of the bracket 106 is abutted. The recessed 120 is suitably arranged to fully receive the vertical flange of the bracket therein such that an exterior side of the flange is substantially flush with the remaining side surface. Two fastener apertures are located to extend laterally through the upper portion 118 in the mounting block in alignment with the corresponding apertures 110 of the bracket to receive the fasteners therethrough for bolting the mounting block to the rear bracket 106 such that it is readily removable by removing the threaded fasteners if desired as described in further detail below.

The mounting block also includes a lower portion 122 extending downwardly from the upper portion below the rear bracket to a bottom face 124 located substantially in horizontal alignment as the same elevation as the bottom wall of the central chamber of the tip body. The bottom face remains near in elevation but spaced slightly upwardly from the lowest portion of the knife of the tip body. The passage through the mounting block for communicating the delivery tube 114 therethrough extends from a top surface of the mounting block rearward of the rear bracket 106 at a downward and forward incline to a discharge outlet located in the horizontally oriented bottom face 124 at a location directly below the rear bracket. The mounting block thus serves to maintain space between the delivery tube 114 and the metallic opener body to minimize the cooling effect on the opener body from the discharge of anhydrous ammonia through the tube 114.

When a secondary delivery tube for conducting granular fertilizer or other particulate material therethrough is provided in addition to the delivery tube 114, the user can readily interchange the secondary granular delivery tube with the delivery tube 114 by removing the mounting block 112 and fastening the secondary delivery tube directly to the rear bracket in place of the mounting block depending upon the desired fertilizer type to be dispensed.

Where it is desirable to prevent soil from being forced into the seam between the inner edge 72 of the wing portions and the opener body under certain soil conditions, the opener body is typically provided with two deflector wings 130 which are integrally and seamlessly joined onto the opposing side surfaces 104 of the body in association with the two wing portions of the tip body respectively. Each deflector wing 130 is mounted substantially rearward of the knife portion of the tip body to be both above and forward of a substantial portion of the rearward portions 50 of the wing portions of the tip body respectively. More particularly, as shown best in FIGS. 1 to 3, the deflector wings 130 are adjacent to the wing portions 40 of the tip so as to extend alongside the inner edges 72 of the wing portions alongside the side surfaces of the opener body directly above the inner edges for deflecting soil outwardly away from the inner edges.

Figure 1:
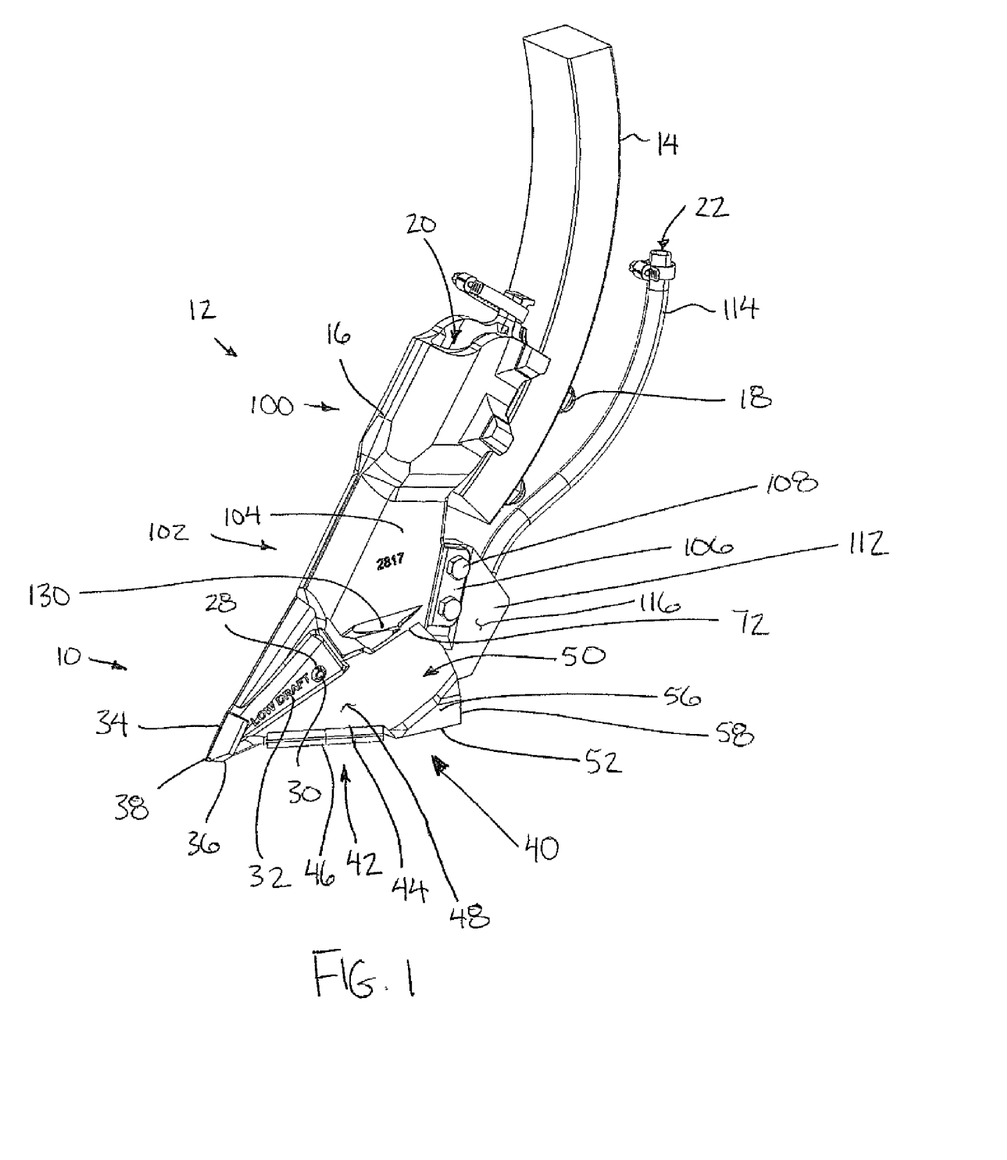
FIG. 1 is a perspective view of the furrow opener.
Figure 2:
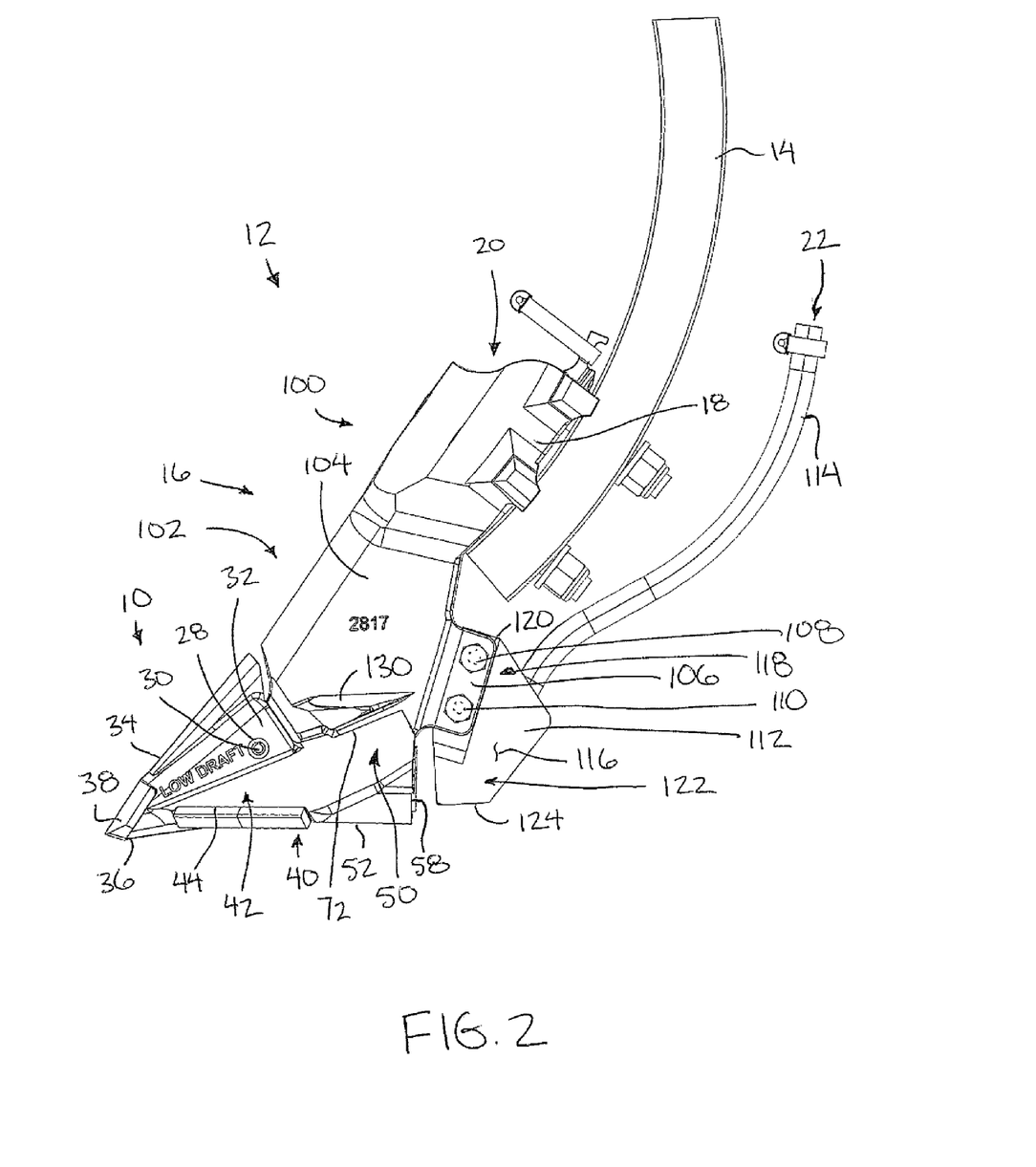
FIG. 2 is a right side elevational view of the furrow opener.
Figure 3:
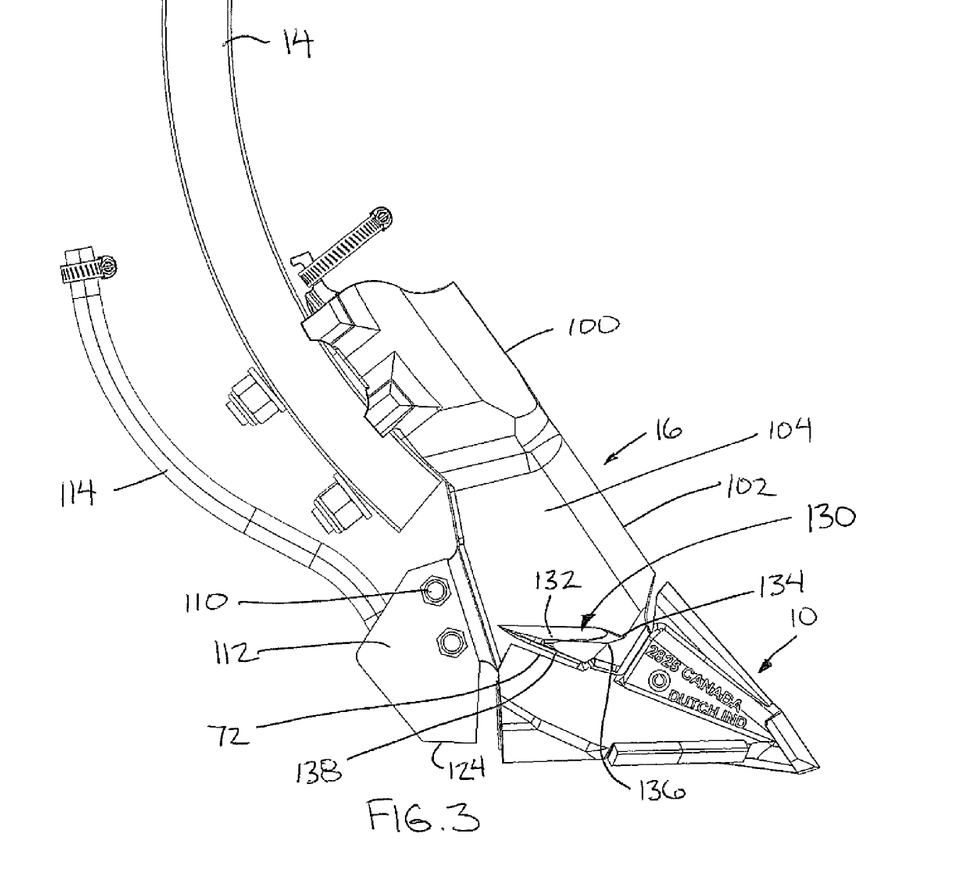
FIG. 3 is a left side elevational view of the furrow opener.
Figure 4:
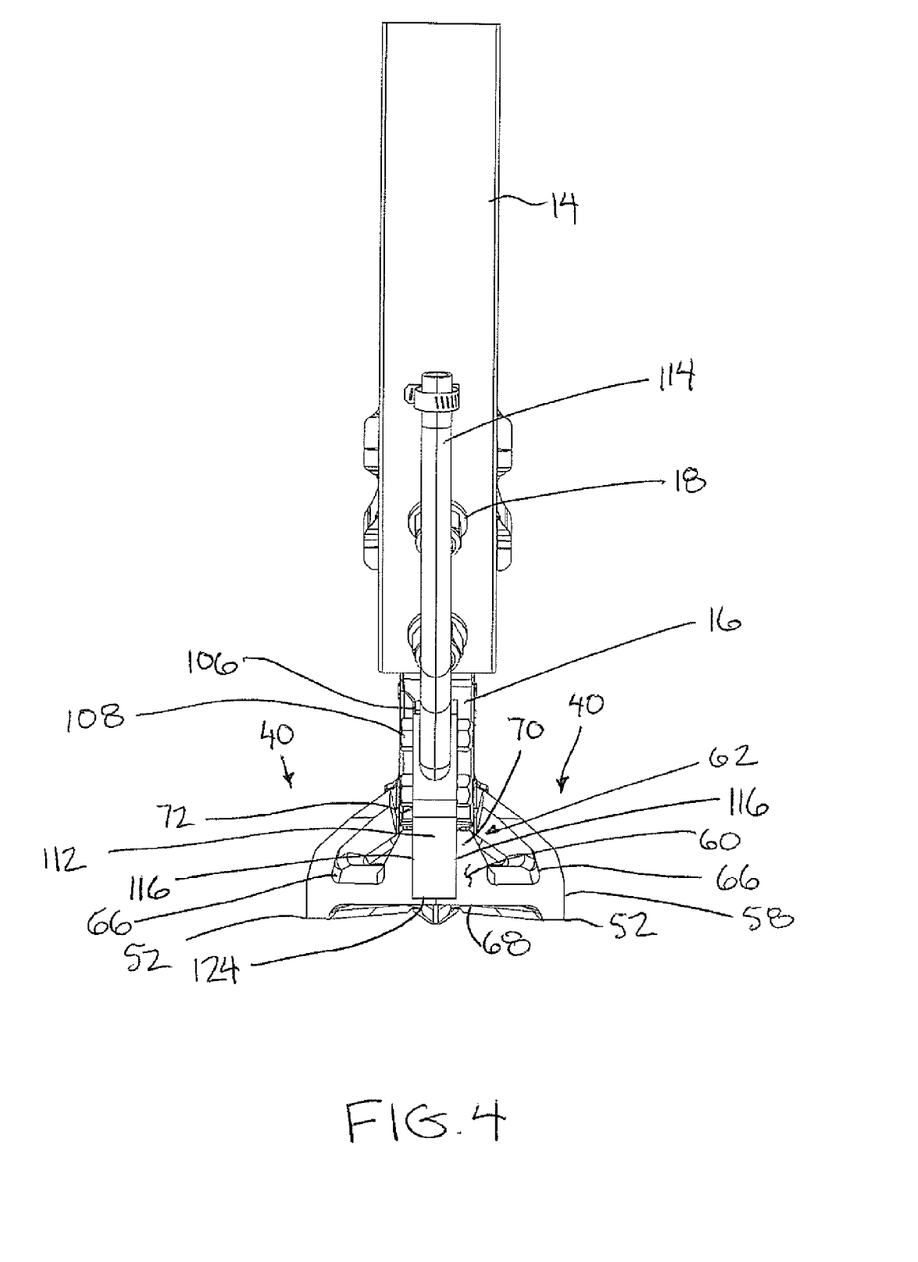
FIG. 4 is a rear elevational view of the furrow opener.

Each deflector wing 130 includes an upper surface 132 which extends from a pointed forward tip 134 of the defector wing to a rear end which is near a rear end of the wings. Each deflector wing also includes a lower surface including a forward portion 136 extending rearwardly from the tip 134 towards the front of the inner edge 72 of the rearward portion 50 of the respective tip body wing. The forward portion 136 extends rearward at a laterally outward inclination so as to form a wedge shape which deflects soil laterally outwardly away from the inner edges. A rear portion 138 of the lower surface of each defector wing extends at an upward and rearward inclination corresponding to the upward and rearward incline of the inner edge 72 so as to extend directly adjacent to and alongside the inner edge along the length thereof to the rear end of the deflector wing.

Figure 5:
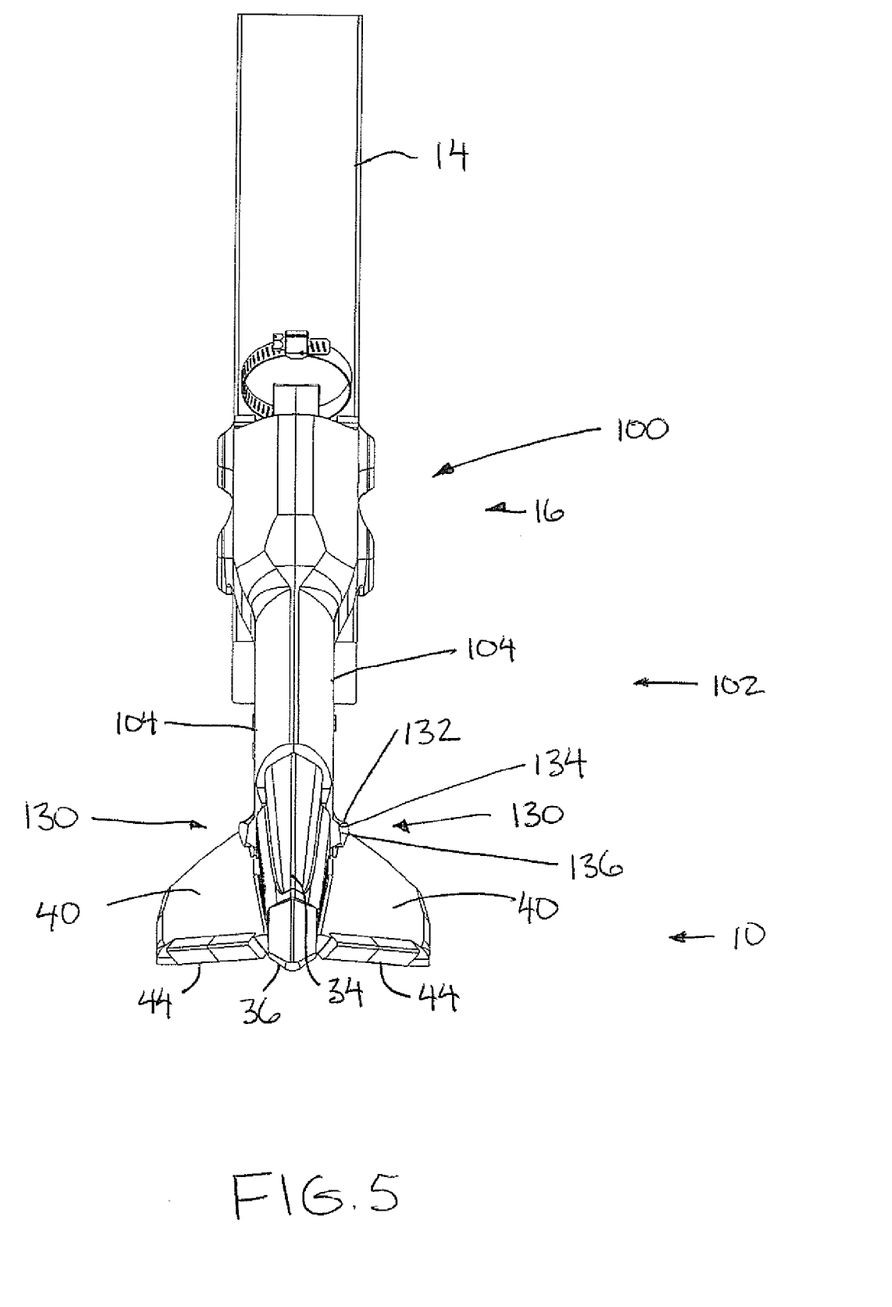
FIG. 5 is a front elevational view of the furrow opener.
Figure 6:
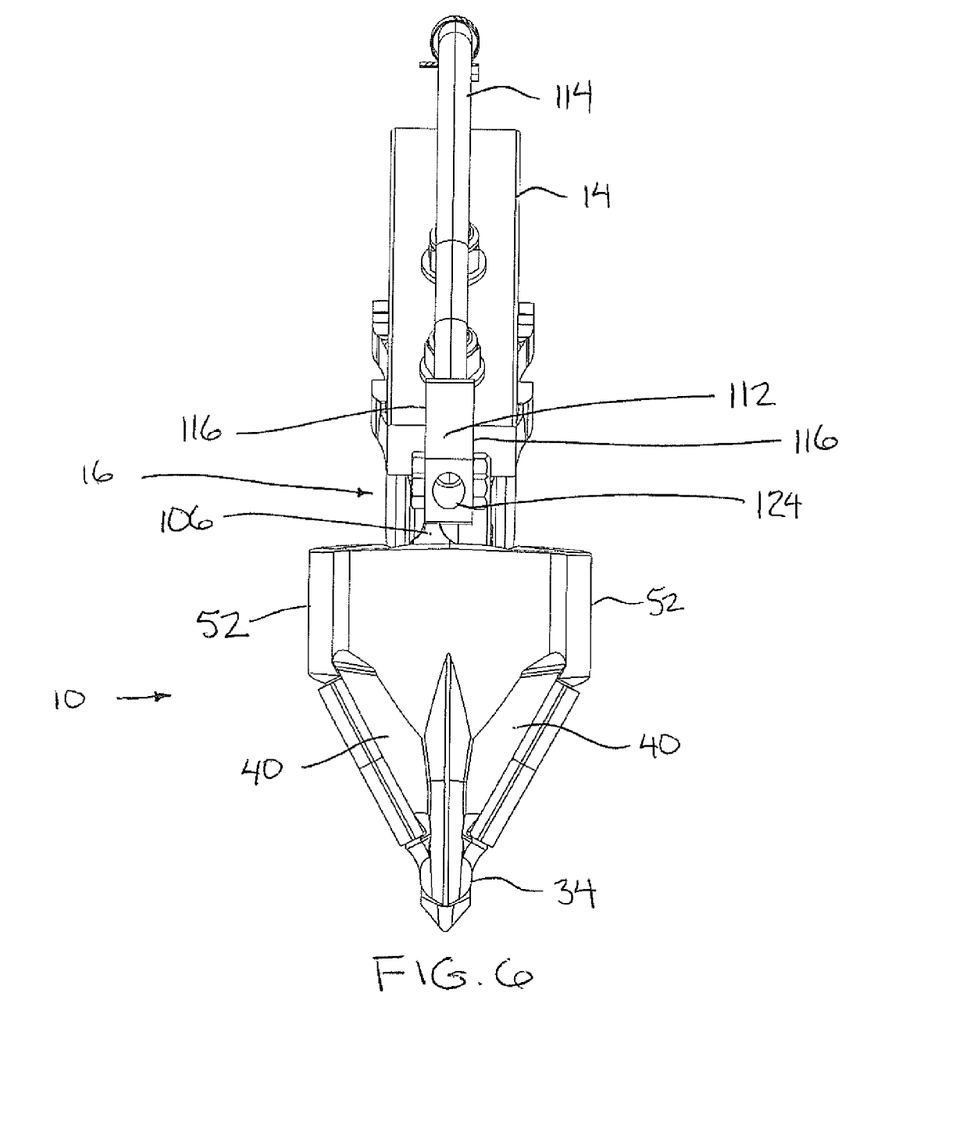
FIG. 6 is a bottom plan view of the furrow opener.
Figure 7:
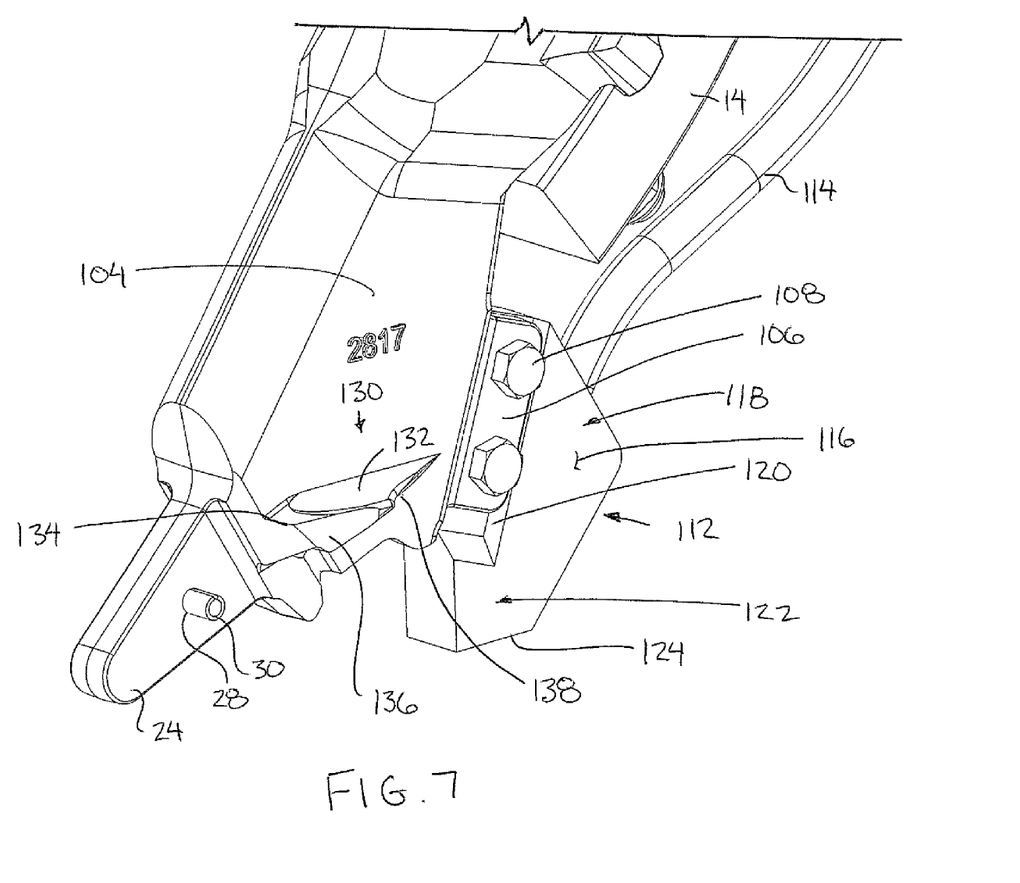
FIG. 7 is a perspective view of the opener body with the tip body shown removed.
Figure 8:
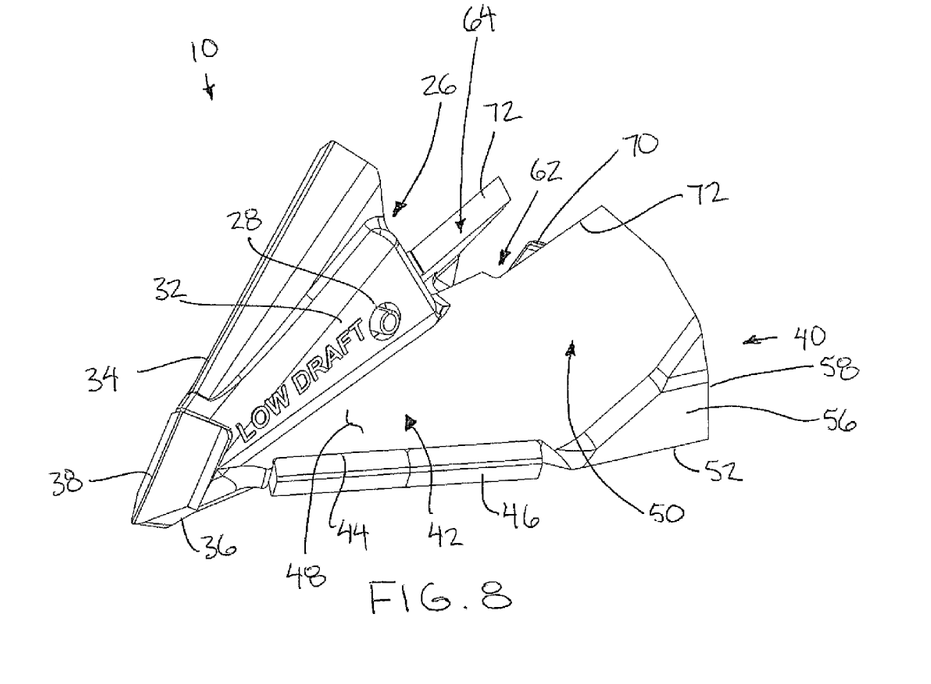
FIG. 8 is a perspective view of the tip body shown separated from the opener body.
Figure 9:
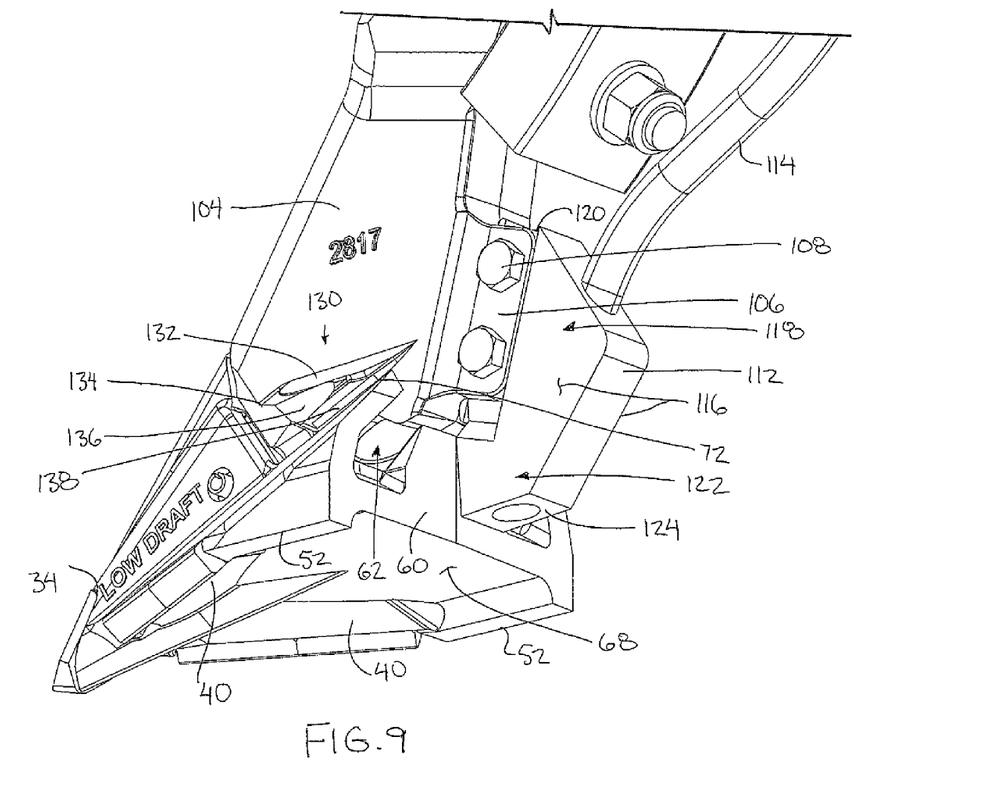
FIG. 9 is a perspective view of the rear and bottom sides of the insulated mounting block for supported an anhydrous ammonia delivery tube.

As shown best in FIG. 5, the deflector wings protrude laterally outwardly in relation to respective portions of the opposing sides 104 of the opener body which are immediately above the deflector wings 130 so as to define an overall width between the outer edges of the two deflector wings which is less than the overall width of the upper portion of the opener body and which is only slightly greater than the overall width of the knife portion of the tip body. In this instance, the wing portions of the tip body protrude laterally outwardly much greater than the deflector wings so that the overall width is much greater at the wing portions of the tip body. The deflector wings thus have little or no effect on the formation of the overall width of the furrow, as well as little or no effect on the drag of the opener moving through the soil, but instead act primarily to redirect the flow of soil directly adjacent the opposing sides of the opener body downwardly and/or laterally outwardly away from the inner edges of the wings on the tip body.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A furrow opener for use with an agricultural implement supported for movement in a forward working direction and having a plurality of implement shanks, the furrow opener comprising:
    an opener body comprising a shank mount arranged to support the opener body on the implement shank for movement therewith in the forward working direction;
    a furrowing tip body comprising:
        a tip mount supporting the tip body on the opener body;
        a knife portion projecting forwardly from the tip mount to a forward end of the tip body; and
        at least one wing portion projecting rearwardly from the knife portion and laterally outwardly in relation to a respective side of the opener body in which the wing portion includes an inner edge substantially abutted with the respective side of the opener body;
    the opener body including a deflector wing protruding from the respective side of the opener body adjacent to said at least one wing portion and above the inner edge of the wing portion in which the deflector wing protrudes laterally outwardly in relation to a portion of the side of the opener body immediately above the wing portion; and
    the tip mount being readily separable from the opener body such that the knife portion and said at least one wing portion are separable from the opener body together with one another.

2. The opener according to claim 1 wherein the deflector wing adjacent to said at least one wing portion is formed in proximity to the inner edge of said at least one wing portion so as to be adapted to deflect soil away from the inner edge of said at least one wing portion as the opener is displaced in the forward working direction.

3. The opener according to claim 1 wherein said at least one wing includes a rear portion which extends rearwardly from the knife portion and the tip mount so as to define the inner edge extending rearward alongside the respective side of the opener body.

4. The opener according to claim 1 wherein the deflector wing adjacent to said at least one wing portion is positioned directly above said at least one wing portion.

5. The opener according to claim 1 wherein said at least one wing portion extends rearwardly from the knife portion to a rear end which is positioned upwardly and rearwardly in relation to a lowermost portion of the deflector wing associated with the wing portion.

6. The opener according to claim 1 wherein the deflector wing adjacent to said at least one wing portion includes a lower surface having a forward portion which extends rearwardly at a laterally outward inclination from a front edge of the deflector wing to define a wedge shape arranged to deflect soil outwardly.

7. The opener according to claim 6 wherein the lower surface of the deflector wing associated with said at least one wing portion includes a rearward portion which extends rearwardly from the forward portion at an upward inclination alongside the inner edge of the deflector wing.

8. The opener according to claim 1 wherein the deflector wing adjacent to said at least one wing portion is integrally and seamless joined with the opener body.

9. The opener according to claim 1 wherein said at least one wing portion comprises a pair of wing portions extending laterally outwardly from opposing sides of the opener body such that the deflector wings associated with each wing portion is supported on a respective one of the opposing sides of the opener body.

10. The opener according to claim 9 further comprising:
    a primary delivery passage extending through the opener body so as to be arranged to deliver a primary particulate material therethrough; and
    an outlet passage extending through the tip body so as to communicate from the primary delivery passage of the opener body to the wing portions to dispense a primary particulate material therethrough rearwardly of the wing portions.

11. The opener according to claim 1 in combination with an agricultural implement having a plurality of anhydrous ammonia delivery tubes wherein the furrow opener further comprises:
    a rear bracket member supported on the opener body rearwardly of the tip body; and
    a mounting block formed of insulating material supported on the rear bracket so as to be selectively separable from the rear bracket member;
    the mounting block including a delivery passage communicating therethrough so as to be arranged for connection to one of the anhydrous ammonia delivery tubes at a location spaced rearwardly from the opener body.

12. A furrow opener for use with an agricultural implement supported for movement in a forward working direction and having a plurality of implement shanks and a plurality of anhydrous ammonia delivery tubes, the furrow opener comprising:
    an opener body comprising a shank mount arranged to support the opener body on one of the implement shanks for movement therewith in the forward working direction;
    a primary delivery passage extending through the opener body so as to be arranged to deliver a primary particulate material therethrough;
    a furrowing tip body comprising:
        a tip mount supporting the tip body on the opener body;
        an outlet passage extending through the tip body so as to communicate from the primary delivery passage of the opener body to an outlet opening at a rear of the tip body; and
        a knife portion projecting forwardly from the tip mount to a forward end of the tip body so as to be arranged to form a furrow in the ground;

the tip mount being readily separable from the opener body such that the knife portion is readily separable from the opener body;

a rear bracket member supported on the opener body rearwardly of the tip body; and a mounting block comprising heat insulating material and being supported on the rear bracket so as to be selectively separable from the rear bracket member;

the mounting block including a delivery passage communicating therethrough so as to be arranged for connection to one of the anhydrous ammonia delivery tubes at a location spaced rearwardly from the opener body such that said one of the anhydrous ammonia delivery tubes is connected to the opener body only through the heat insulating material of the mounting block; and the mounting block further comprising an upper portion fastened to the rear bracket and a lower portion extending below the rear bracket directly rearward of the tip body in which an outlet of the delivery passage is located in a bottom wall of the lower portion of the mounting block rearward of the tip body.

13. The opener according to claim 12 wherein the shank mount is arranged to support the opener body on a forward face of the implement shank and the rear bracket extends rearwardly from the opener body below the shank mount such that the mounting block is aligned with an anhydrous ammonia delivery tube rearward of the implement shank.

14. The opener according to claim 12 wherein the rear bracket comprises a vertical flange including fastener apertures therein in alignment with corresponding fastener apertures in the mounting block which receive fasteners extending therethrough.

15. The opener according to claim 12 wherein the rear bracket is laterally offset towards one side of the opener body and is mounted against a corresponding side surface of the mounting block.

16. The opener according to claim 12 wherein there is provided a recess formed in a side surface of the mounting block which receives the rear bracket therein.

17. The opener according to claim 12 wherein the rear bracket is integrally and seamlessly joined with the opener body.

18. The opener according to claim 12 in combination with a secondary delivery tube arranged to deliver a secondary particulate material therethrough, the secondary delivery tube and the mounting block being interchangeably supported on the rear bracket.

19. The opener according to claim 1 wherein the deflector wing adjacent to said at least one wing portion includes a portion which extends rearwardly at a laterally outward inclination to define a wedge shape arranged to deflect soil outwardly.

\* \* \* \* \*